United States Patent Office 2,901,172
Patented Aug. 25, 1959

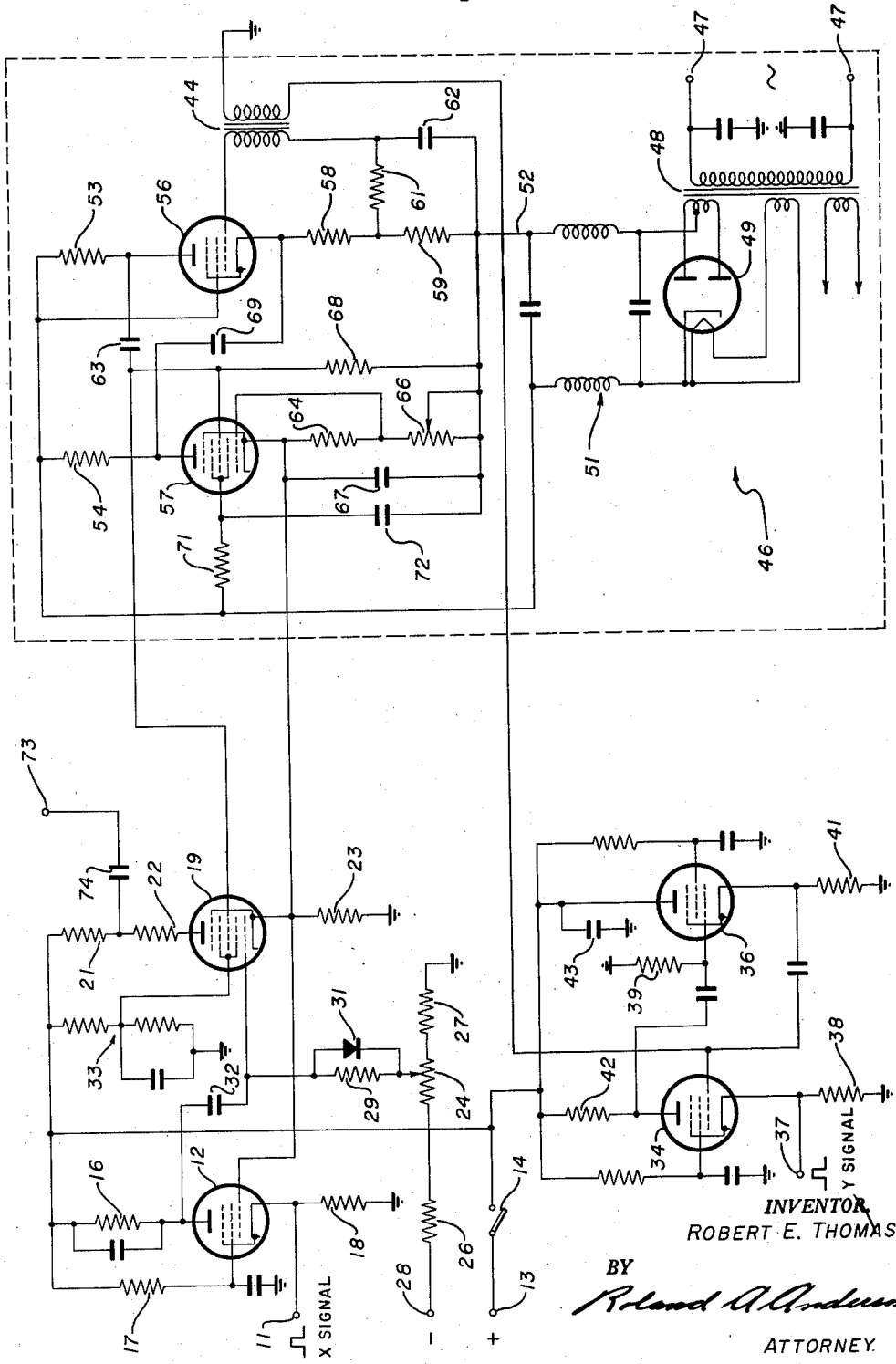

2,901,172

ELECTRONIC MULTIPLIER CIRCUIT

Robert E. Thomas, Walnut Creek, Calif., assignor to the United States of America as represented by the United States Atomic Energy Commission Application August 6, 1954, Serial No. 448,399

10 Claims. (Cl. 235—194)

The present invention relates to improved electronic multiplying method and means and to an improved electronic circuit including a multielement vacuum tube receiving two voltage signals and producing therefrom an output voltage having an amplitude proportional to the product or quotient of the input signals.

Although mathematical functions have been previously carried out by electronic means, there is normally employed a large number of circuit components having an undesirable complexity to produce a required accuracy therefrom and also many conventional means of this type contain inherent limitations which make same unsuited for various applications. The present invention does not possess these limitations and is capable of producing a resultant signal proportional, with a high degree of accuracy, to the product of two independently variable input signals.

The present invention is adaptable to a wide variety of applications; however, one in particular is worthy of note herein by way of illustration rather than limitation. In the study of radiation it is important to determine not only the presence thereof but also the particular particles constituting same, and in many instances it is important to obtain this information quite rapidly and substantially simultaneously. The present invention is quite advantageous in this respect as the characteristic Bragg curve of ionization for each particle is quite similar over a range of values to a hyperbolic function of 45 degrees rotation, characterized by the expression:

$$XY = K$$

where X and Y are independent variables and K is a constant.

For each charged particle in motion there is a characteristic Bragg curve of ionization comprising a plot of the total kinetic energy (E) of the charged particle in motion against the rate of change of energy with respect to distance traveled $(dE/dx)$, the curves being like in shape but different in size for different particles. The rising portion of the curve is substantially hyperbolic so that:

$$(dE/dx)E = C$$

where C is substantially a constant for any single kind of charged particle in motion. Following the measurement as by a probe of $dE/dx$ and by a total absorber of E so as to produce two independent voltage signals proportional one to $dE/dx$ and one to E, these signals may be multiplied in accordance with the present invention. This product voltage is thus proportional to C so that with suitable calibration there is produced an instantaneous identification of the particles present in any radiant beam.

It is an object of the present invention to provide an improved method and means for the multiplication of voltage signals.

It is another object of the present invention to provide an improved electronic circuit for multiplying voltage signals and including a multielement vacuum tube.

It is a further object of the present invention to provide a multiplier circuit having a vacuum tube with at least three grids therein and impressing thereon signals of different levels for multiplication thereof in said tube.

It is a still further object of the present invention to provide a multiplier circuit having a vacuum tube with two control grids and impressing a first input signal upon one grid and the sum of the first and a second signal upon the other grid whereby the tube output is proportional to the product of the two input signals.

Numerous other possible objects and advantages of the invention will become apparent to those skilled in the art from the following description of the invention taken together with the accompanying drawing wherein the sole figure is a schematic diagram of a multiplier circuit in accordance with the present invention.

Considering now the details of the method and means for multiplication as contemplated by the present invention and referring to the illustrated multiplier of the drawing, there will be seen to be provided a first input terminal 11 adapted to receive an X input signal, such as pulsed voltage signals, and which is connected to the cathode of a vacuum tube 12. Plate voltage for certain of the tubes in the circuit is obtained from an external plate supply (not shown) to which a terminal 13 is adapted to be connected and a switch 14 is connected to the terminal 13 for turning the circuit on and off. The plate of the tube 12 is connected through a by-passed plate resistor 16 to the switch 14 and a screen grid of the tube is grounded through a by-pass condenser and connected through a resistor 17 to the switch 14. The cathode of the tube 12 is grounded through a resistor 18 across which the input X signal is developed and a suppressor grid of the tube may be tied to the cathode. Actual multiplication is performed in a second vacuum tube 19 having two control grids and connected in circuit with tube 12. The plate of tube 19 is energized from the positive terminal 13 through a pair of serially-connected resistors 21 and 22 connected to the switch 14, and the tube cathode is grounded through a resistor 23. Control grid bias for the first control grid of the tube 19 is obtained from a potentiometer 24 connected in series between a pair of resistors 26 and 27 between ground and a terminal 28 adapted to have a negative potential impressed thereon from an external power supply (not shown). This first control grid of tube 19 is connected through a resistor 29 to the movable contact of the potentiometer 24 so that the control grid bias is variable, and a crystal diode 31 is connected across the grid bias resistor 29 for improving the wave form of the pulses applied to the first control grid from the plate of the first vacuum tube 12 through a coupling capacitor 32. The screen grid of the second tube 19, which preferably substantially encompasses the second control grid thereof, as schematically illustrated in the drawing, is connected to the mid-point of a voltage divider 33 in turn connected between ground and the plate supply terminal 13, and a by-pass capacitor is connected between the screen grid and ground. An inverse feed-back system is also provided by the direct connection of the cathode of the second tube 19 to the control grid of the first tube 12 with the feed-back voltage being developed across the cathode resistor 23 of the second tube. The suppressor grid of tube 19 may be tied directly to the tube cathode, as shown.

The foregoing circuit completes the X-signal portion of the multiplier and with regard to the Y-signal portion thereof, there is provided a pair of vacuum tubes 34 and 36 connected as a feed-back amplifier with linear response. An input terminal 37 adapted to receive the Y signals is connected to the cathode of the tube 34 and a load resistor 38 grounds the terminal 37.

The plate of the tube 34 is capacitively coupled to the control electrode of the tube 36, with this electrode being grounded through a resistor 39. The cathode of the tube 36 is grounded through a resistor 41 across which is developed a feed-back voltage that is applied to the control electrode of the tube 34 through a capacitor coupling the control electrode and cathode of tubes 34 and 36, respectively. Plate voltage is supplied to the tubes 34 and 36 from terminal 13 with the plate of tube 34 connected to same through a dropping resistor 42 and the plate of tube 36 directly connected thereto and being grounded through a by-pass capacitor 43. The suppressor grids of each of the tubes 34 and 36 may be tied directly to their respective tube cathodes and the screen grids are each biased from the plate supply through appropriate resistors and are each grounded through by-pass capacitors. An output signal is obtained from the above-described amplifier circuit at the control electrode of the first tube 34 for impedance matching purposes and is applied to one terminal of the primary winding of a transformer 44, the other terminal of which is grounded.

The above-described X-signal circuit and Y-signal circuit produce signals having reference to electrical ground, and through the proper choice of circuit components and operating values the resultant X and Y signals retain their original relative amplitudes inasmuch as a single direct current voltage source (not shown) connected to terminal 13 is employed for both circuits. In order for the multiplier tube 19 to produce signals proportional to the product of impressed X and Y control signals, it is necessary that one of the signals have an amplitude relative to the other rather than to electrical ground and to this end there is provided a second feed-back amplifier having its own power supply with the amplifier and power supply thereof being isolated from ground as by insulator mounting, indicated by the dotted line about these circuits in the drawing. The transformer 44 couples the grounded portion of the Y-signal circuit to the floating part thereof, and there is provided for this latter circuit a power supply 46 having input terminals 47 adapted for connection to an external source of alternating current voltage (not shown). As regards the power supply, same is conventional in including a transformer 48 having a primary winding connected across the input terminals and a secondary winding connected in circuit with a double-diode rectifier tube 49. Rectified voltage is taken between the cathode of the rectifier tube 49 and a centertap of the transformer secondary winding between the rectifier tube anodes, and a filter system 51 is connected between these points to reduce voltage ripple. A common return line 52 is connected to one side of the filter and a positive voltage line to the other and through dropping resistors 53 and 54 to a pair of vacuum tubes 56 and 57, respectively. The first amplifier tube 56 may comprise a pentode vacuum tube with the cathode thereof connected to the return line 52 through serially-connected resistors 58 and 59. The control electrode of tube 56 is connected to one terminal of the secondary winding of the transformer 44, while the other terminal thereof is connected through a resistor 61 to the juncture of cathode resistors 58 and 59 and also to the return line 52 through a by-pass capacitor 62. The signal from tube 56 is applied from the plate thereof through a coupling capacitor 63 to the second control electrode of the multiplier tube 19; however, the operating level of the tube 56 is set by tube 57 which has the cathode thereof tied directly to the cathode of the multiplier tube 19. The cathode of tube 57 is connected to the return line 52 through a pair of serially-connected resistors 64 and 66 by-passed by a capacitor 67, and the resistor 66 tied to the return line 52 may comprise a potentiometer, as shown, to provide a zero adjustment for the circuit. The first control grid of tube 57 may be biased by connection to the juncture of resistor 64 and potentiometer 66. The second control grid of tube 57 is connected to the return line 52 through a resistor 68 and is coupled to the anode of tube 56 by a capacitor 63 for receiving control voltage to operate tube 57 as a feedback tube having its output coupled to the cathode of tube 56 through a capacitor 69. The screen grids of the tube 57 are biased by connection through a resistor 71 to the plate voltage supply 46 with a by-pass capacitor 72 grounding the grids to the return line 52, and the suppressor grid of tube 57 may be internally connected to the tube cathode. Tube 57 will thus be seen to operate as a 100% feed-back ampifier and the portion of the circuit including tubes 56 and 57 will be seen to float at the X potential, the capacitors 62, 72 and the capacitor across the power supply filter output insuring that the tubes so operate.

An output signal proportional to the product of input signals is produced at the plate of the multiplier tube 19. An output terminal 73 is connected through a capacitor 74 and the resistor 22 to the plate of the multiplier tube 19 so as to receive the output signals from the multiplier tube 19.

Considering now the overall operation of the circuit described above and first energizing the circuit by the application of suitable power to the terminals 13, 28, and 47, the multiplier tube 19 is biased through the potentiometer 24 to the point of conductivity. Application of a positive pulse to the terminal 11 reduces the conductivity of tube 12 by raising the cathode potential, and the resultant proportional plate voltage increase is coupled to the first control electrode of the multiplier tube 19 through the capacitor 32. Increased conductivity of tube 19 raises the potential of the cathode thereof by virtue of the increased current flow through the cathode resistor, and this potential is fed back to the first control electrode of tube 12 to stabilize operation of this portion of the circuit.

Application of a positive voltage pulse to the terminal 37 affects the Y-signal circuit similarly to the X-signal circuit in that the cathode potential of the first tube 34 is raised thereby and the tube conduction thereby reduced to raise the plate potential. Coupling of this increased potential to the control electrode of the second tube 36 increases the conductivity thereof so that the cathode potential rises, and as same is applied to the control electrode of the first tube 34 the feedback stabilizes operation. The cathode voltage variations of the second Y-signal tube 36 are also applied across the primary of the isolation transformer 44 for affecting the floating portion of the circuit.

As to the floating portion of the circuit, same will be seen to be connected at the cathode of the tube 57 to the cathode of the multiplier tube 19 so that the tubes 56 and 57 operate from a base determined by the X signal at the multiplier tube 19. The cathode of the tube 57 is maintained at the same potential as the cathode of the multiplier tube 19 by the direct connection therebetween so that the signal applied to tube 57 at the second control grid thereof from the tube 56 controls tube 57 above the X-signal base. As tube 57 is connected from the plate thereof to the cathode of tube 56, this latter tube also operates above the X-signal base and such is made possible by the isolation transformer 44 whereby the control signal for tube 56 is not related to ground potential but instead only to the return line 52 that is likewise electrically floating. The steady state condition of tubes 56 and 57 is set by the potentiometer 66 which controls the potential difference between the return line 52 and the tubes 56 and 57, and the Y signal at the transformer 44 applied therethrough to the first control electrode of tube 56 varies the output signal thereof relative to this condition. Simultaneous application of X and Y signals to the system causes the return line potential to vary with the X signal by virtue of the paths through capacitors 67, 62, and the power supply output capacitor so that the Y signal across the secondary of transformer 44 is thus relative to the X signal when applied to tube 56.

The multiplier tube 19 receives a signal at the first control grid thereof from tube 12 proportional to the absolute value of the X signal and a second signal at the second control electrode proportional to X+Y signal. For multielement tubes having two control electrodes as herein illustrated the plate current is related to the grid voltages as follows:

$$i_p = K e g_1 (e g_2 - e g_1)$$

where $i_p$=plate current
$eg_1$=first control grid potential
$eg_2$=second control grid potential
$K$=constant of the tube This relationship is herein satisfied as the X signal= $eg_1$ and the Y signal=$eg_2-eg_1$, i.e., $eg_2$=Y signal+X signal. Consequently, the plate current $i_p$ of tube 19 is accurately proportional to the product of the X and Y signals over a range of values and instantaneous electronic multiplication of the input signals is provided.

As regards the improved method of multiplication of the present invention, same will be seen to consist of a relatively few steps, wherein the signals to be multiplied are suitably related to one another and are then simultaneously applied to a single multielement electronic tube wherein the resultant plate signal is proportional to the product of input signals. Thus, the method may be described as comprising the steps of producing first and second signals proportional to a pair of input signals and related to a common base, adding said signals to produce a single sum signal, and applying said first signal and said sum signal upon separate control electrodes of a multielement electron tube whereby the output thereof is proportional to the product of the first and second signals. This latter step may be otherwise described as producing in a vacuum tube a current flow proportional to the first signal and limiting the part thereof reaching the tube anode to a portion proportional to the sum signal. The relationship of signals at the multiplier tube may be written as:

$$i_p \triangleq eg_1 (eg_3 - eg_1)$$

wherein:

$i_p$=tube plate current
$eg_1$=voltage on first electrode of tube
$eg_2$=voltage on third electrode of tube
(second control electrode)

The tube plate current will thus be seen to be proportional to the product of a pair of input signals $e_x$ and $e_y$ in the instance where one input signal $e_y=eg_3-eg_1$ or $eg_3=e_y+eg_1$ and the other input signal $e_x=eg_1$ so that $eg_3=e_x+e_y$. With these signal relationships established the tube plate current is thus seen to be proportional to the product of input pulses, $i_p \triangleq e_x e_y$, and there is provided a simple method of multiplying electronic signals.

What is claimed is:

1. An electronic multiplier circuit comprising first and second input terminals adapted to receive simultaneous pulsed voltage signals for multiplication, a first multielement electron tube having at least two control electrodes, means applying a first signal at said first input terminal to one control electrode of said tube, a second electron tube having a cathode and a control electrode, means coupling said first input terminal to the cathode of said second tube, isolating means applying a second signal at said second input terminal between the cathode and the control electrode of said second tube without reference to electrical ground whereby the output thereof is proportional to the sum of said first and second input signals, and means coupling the output of said second tube to the second control electrode of said first electron tube whereby the output thereof is proportional to the product of simultaneous signals at said pair of input terminals.

2. An electronic multiplication circuit comprising first and second input terminals adapted to receive simultaneous voltage signals, first and second amplifier means connected to said first and second input terminals respectively, third amplification means connected to said first amplification means for operating at a voltage level determined thereby and connected to receive as a control signal the output of said second amplification means whereby the output of said third amplification means is proportional to the sum of signals applied to said input terminals, and a multiplier tube having a pair of control electrodes with the first thereof coupled to the output of said first amplifier means and the other coupled to the output of said third amplifier means whereby the multiplier output is proportional to the product of signals simultaneously applied to said first and second input terminals.

3. An electronic multiplier circuit as claimed in claim 2 further defined by said third amplifier means comprising a feed-back amplifier of unity gain including two electron tubes with the first thereof being coupled to said first amplifier means, and the second tube thereof having a control electrode connected to receive the output of said second amplifier means and a plate electrode coupled to said multiplier tube for impressing thereon signals proportional to the sum of simultaneous input signals.

4. A multiplier circuit comprising an electron tube having at least two control electrodes and an intervening electrode maintained at a positive potential relative to a tube cathode, an amplifier tube adapted to receive a first input signal and coupled to a control electrode of said multiplier tube for controlling conduction from the cathode to the intervening electrode thereof, first amplifier means adapted to have impressed thereon a second simultaneous input signal, second amplifier means having an electrical ground line, mans coupling the cathode of said electron tube to said electrical ground line whereby said second amplifier means operates upon a base of said first signal, an isolation transformer coupling said first amplifier means to said second amplifier means for control thereof whereby the output of said second amplifier means is proportional to the sum of simultaneous input signals, and means coupling the output of said second amplifier means to the second control electrode of said multiplier tube whereby the output of said tube is proportional to the product of simultaneous input signals.

5. A multiplier circuit comprising a first amplifier means adapted to receive first input signals, a pentagrid multiplier tube including first and second control electrodes and a cathode, means coupling said first amplification means to said multiplier tube for impressing upon the first control electrode thereof said first input signals, second amplifier means adapted to receive second input signals, third amplifier means including two electron tubes coupled together as a feed-back amplifier with the first thereof having a cathode joined to the cathode of said multiplier tube, an isolation transformer coupling the output of said second amplifier means to the second tube of said third amplifier means whereby the output of the latter is proportional to the sum of simultaneous first and second input signals, and means coupling said third amplifier means to the second control electrode of said multiplier tube whereby the multiplier tube output is proportional to the product of simultaneous input signals.

6. A multiplier circuit comprising first amplifier means including a tube having a cathode, anode, and control electrode, a cathode resistor grounding the cathode of said tube and said cathode being adapted to receive a first input signal, second amplifier means adapted to receive second input signals and producing signals proportional thereto, third amplifier means including first and second electron tubes coupled as a feed-back amplifier, an isolation transformer coupling the output of said second amplifier means to the second tube of said third amplifier means for controlling conduction thereof, a multielement electron tube having a pair of control electrodes and a cathode grounded through a resistor, electrical connections coupling the output of said first amplifier means to a control electrode of said multielement electron tube and the cathode of the latter to the control electrode of the former, means coupling the output of said third amplifier means to the other control electrode of said electron tube, means coupling the cathode of the multielement electron tube to the cathode of the first tube of said third amplifier means, and capacitor means operatively connected in circuit between said isolation transformer and said third amplifier means whereby the output of the latter is proportional to the sum of simultaneous first and second input signals and the output of said multielement electron tube is proportional to the product of said input signals.

7. A multiplier circuit comprising a first vacuum tube adapted to receive first signals, a multiplier tube having first and second control electrodes with the first control electrode thereof coupled to the output of said first tube, an amplifier adapted to receive second input signals, a floating circuit including a power supply and a pair of vacuum tubes operated thereby and having control means, an isolation transformer having a primary winding connected to the output of said amplifier and a secondary winding connected to the control means of one tube of said floating circuit, means coupling said floating circuit including the power supply thereof to said multiplier tube and first vacuum tube whereby said floating circuit operates above the voltage level of the first signals at said first vacuum tube an amount equal to said second signals, and means coupling the output of said floating circuit to the second control electrode of said multiplier tube whereby the output thereof is proportional to the product of said first and second input signals.

8. A multiplier circuit comprising a multielement multiplier tube including a cathode and two control electrodes of which the first alone controls cathode current and the second controls plate current, first amplifier means adapted to receive a first input signal and coupled to the first control electrode of said multiplier tube for impressing said signal thereon, second amplifier means adapted to receive a second input signal, a vacuum tube having a control electrode and cathode, said cathode coupled to said first amplifier means to float above, said first input signal amplitude, a transformer coupling the output of said second amplifier means to the control electrode of said vacuum tube whereby the output thereof is proportional to the sum of said first and second signals, and means coupling the output of said vacuum tube to the second control electrode of said multiplier tube whereby the output thereof is proportional to the product of said first and second signals.

9. A multiplier circuit comprising a multiplier tube having a cathode and a pair of control electrodes with the potential of the first control electrode controlling cathode current and the potential of the second control electrode controlling the proportion of cathode current reaching the tube plate, a resistor grounding the cathode of said multiplier tube, first amplifier means adapted to receive first input signals and including a vacuum tube having the plate thereof coupled to the first control electrode of said multiplier tube, means impressing a controlled bias potential upon the first control electrode of said multiplier tube, second amplifier means adapted to receive second input signals, a common power supply energizing said first and second amplifier means whereby output signals thereof are similarly proportional to the input signals, an adder circuit including a vacuum tube having control means, means coupling said adder circuit to the cathode of said multiplier circuit for biasing the adder circuit therefrom, an isolation transformer having a primary winding connected to the output of said second amplifier means and a secondary winding connected to the control means of the tube of said adder circuit whereby the adder circuit output is proportional to the sum of said first and second input signals, and means coupling the output of said adder circuit to the second control electrode of said multiplier tube whereby the output thereof is proportional to the product of said first and second signals.

10. A multiplier circuit as claimed in claim 9 further defined by said adder circuit comprising first and second vacuum tubes each having cathodes and anodes, cathode resistors for each of said tubes, a power supply isolated from electrical ground and connected between the anodes and cathode resistors of said tubes for energizing same, said first tube having self-biased control means and having the cathode thereof tied to the cathode of said multiplier tube, means coupling the plate of said first tube to the cathode of the second tube, said second tube having control means connected to a first end of the secondary winding of said isolation transformer, capacitor means by-passing the cathode resistor of said first tube and coupling the second end of the transformer winding to the cathode resistor of said second tube whereby said adder circuit has an electrical ground equal to the cathode potential of said multiplier tube so that the plate voltage of the second adder tube is proportional to the sum of said first and second signals, and means coupling the anode of said second adder tube to the second control electrode of said multiplier tube whereby the output of the latter is proportional to the product of first and second input signals.

References Cited in the file of this patent

UNITED STATES PATENTS 1,869,209     Mead _____ July 26, 1932

OTHER REFERENCES

Waveforms (Chance et al.), 1949, page 670.
Electron tube Circuits (Seely), 1950, pages 152, 153.